United States Patent
Guimaraes et al.

(10) Patent No.: US 10,968,955 B1
(45) Date of Patent: Apr. 6, 2021

(54) ROLLING BEARING WITH FLAP SEAL

(71) Applicant: SCHAEFFLER TECHNOLOGIES AG & CO. KG, Herzogenaurach (DE)

(72) Inventors: Cleiton Carvalho Guimaraes, Sorocaba (BR); Pedro Gabriel Camargo de C Montanari, Sorocaba (BR); Guilherme Camara, Sorocaba (BR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/807,823

(22) Filed: Mar. 3, 2020

(51) Int. Cl.
*F16C 33/78* (2006.01)
*F16C 19/46* (2006.01)
*F16C 33/72* (2006.01)
*F16C 19/26* (2006.01)

(52) U.S. Cl.
CPC .......... *F16C 33/783* (2013.01); *F16C 33/723* (2013.01); *F16C 33/7823* (2013.01); *F16C 19/26* (2013.01); *F16C 19/466* (2013.01); *F16C 33/7809* (2013.01)

(58) Field of Classification Search
CPC .......... F16C 19/26; F16C 19/44; F16C 19/46; F16C 19/466; F16C 33/723; F16C 33/783; F16C 33/767; F16C 33/784; F16C 33/7809; F16C 33/7843; F16C 33/7853; F16C 33/7856; F16C 33/78609; F16C 19/463; F16C 33/581; F16J 15/32; F16J 15/322; F16J 15/3204; F16J 15/3268
See application file for complete search history.

(56) References Cited

U.S. PATENT DOCUMENTS

| | | | | |
|---|---|---|---|---|
| 3,539,232 A * | 11/1970 | Batt | ...................... | F16C 19/466 384/473 |
| 3,784,268 A * | 1/1974 | De Gioia | .............. | F16C 21/005 384/478 |
| 4,353,605 A * | 10/1982 | Chiba | ................... | F16C 33/605 384/465 |
| 2014/0177992 A1* | 6/2014 | Schaefers | .............. | F02M 26/70 384/486 |
| 2014/0248016 A1* | 9/2014 | Habibvand | ......... | F16C 33/7806 384/482 |
| 2020/0217359 A1* | 7/2020 | Edelmann | ........... | F16C 33/7823 |

FOREIGN PATENT DOCUMENTS

JP 2014114927 A * 6/2014

OTHER PUBLICATIONS

Machine Translation of JP 2014-114927 (Year: 2014).*

* cited by examiner

*Primary Examiner* — Alan B Waits
(74) *Attorney, Agent, or Firm* — Brooks Kushman P.C.

(57) ABSTRACT

A bearing includes an annular cup having an outer race and a radially extending flap. The flap defines an inner circumferential surface and a notch extending outwardly from the inner circumferential surface. The notch includes opposing radially extending sides, an outer circumferential wall, and a locking lip raised from the outer wall. Rolling elements are seated on the outer race and arranged to ride on a shaft. A sealing disc has an outer circumferential surface disposed against the inner circumferential surface and a tab received in the notch with the locking lip extending radially over the tab to secure the scaling disc to the cup.

11 Claims, 4 Drawing Sheets

ROLLING BEARING WITH FLAP SEAL

TECHNICAL FIELD

The present disclosure relates to rolling bearings and more particularly to embodiments of sealing a rolling bearing.

BACKGROUND

A bearing is one type of friction-reducing component. Many different types of bearings are used in a variety of applications. Rolling bearings are one type of bearing that are commonly used in automotive applications. A typical rolling bearing includes a first race, a second race, and a plurality of rolling elements disposed between the first and second races. The rolling elements may be spherical (commonly called ball bearings) or cylindrical (sometimes called needle bearings). The rolling elements act between the races to provide smooth, low friction rotation. A cage is sometimes used to hold the rolling elements in place to prevent contact and maintain spacing. The cage is disposed in the space defined between the races.

SUMMARY

According to one embodiment, a bearing includes an annular cup having an outer race and a radially extending flap. The flap defines an inner circumferential surface and a notch extending outwardly from the inner circumferential surface. The notch includes opposing radially extending sides, an outer circumferential wall, and a locking lip raised from the outer wall. Rolling elements are seated on the outer race and arranged to ride on a shaft. A sealing disc has an outer circumferential surface disposed against the inner circumferential surface and a tab received in the notch with the locking lip extending radially over the tab to secure the sealing disc to the cup.

According to another embodiment,
a bearing includes an annular cup having a ring portion defining an outer race, a plate portion forming an enclosed side of the cup, and a flap portion extending radially inward from the ring portion and having an inner circumferential surface defining an opening into the cup. Rolling elements are seated on the outer race. A sealing disc is disposed around the opening and configured to form a seal around a shaft. The flap portion and the sealing disc include cooperating first and second retaining features, respectively, that create a click-fit between the flap portion and the sealing disc.

According to yet another embodiment, a bearing includes an annular cup having an outer race and a radially extending flap. The flap defines an inner circumferential surface and a notch extending outwardly from the inner circumferential surface and defining a channel. Rolling elements are seated on the outer race. A sealing disc has an outer circumferential surface disposed against the inner circumferential surface and a tab received in the notch with a tip portion disposed in the channel to secure the sealing disc to the cup.

DETAILED DESCRIPTION

Figure 1:
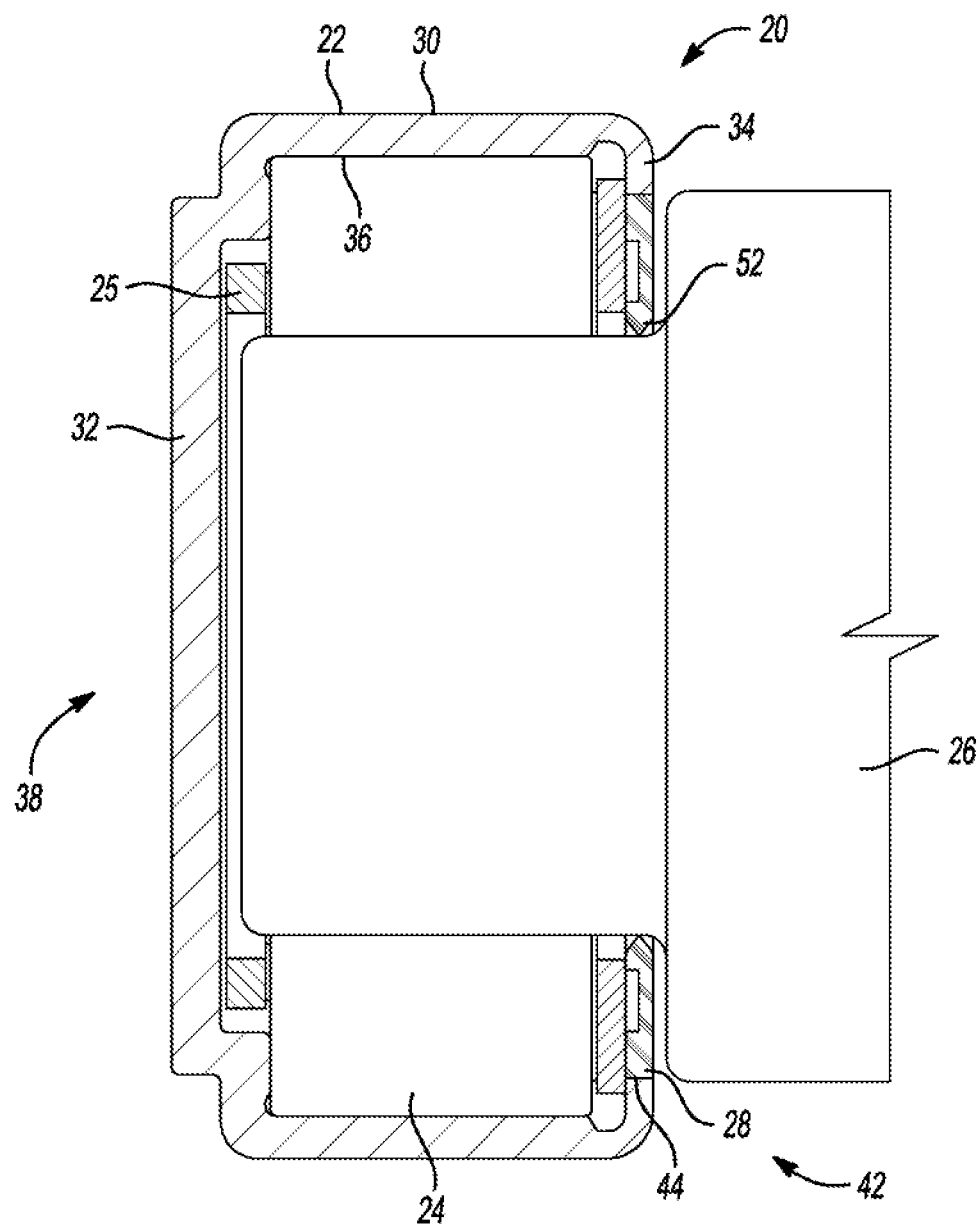
FIG. 1 is a side view, in cross section, of a rolling bearing.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made.

Figure 2:
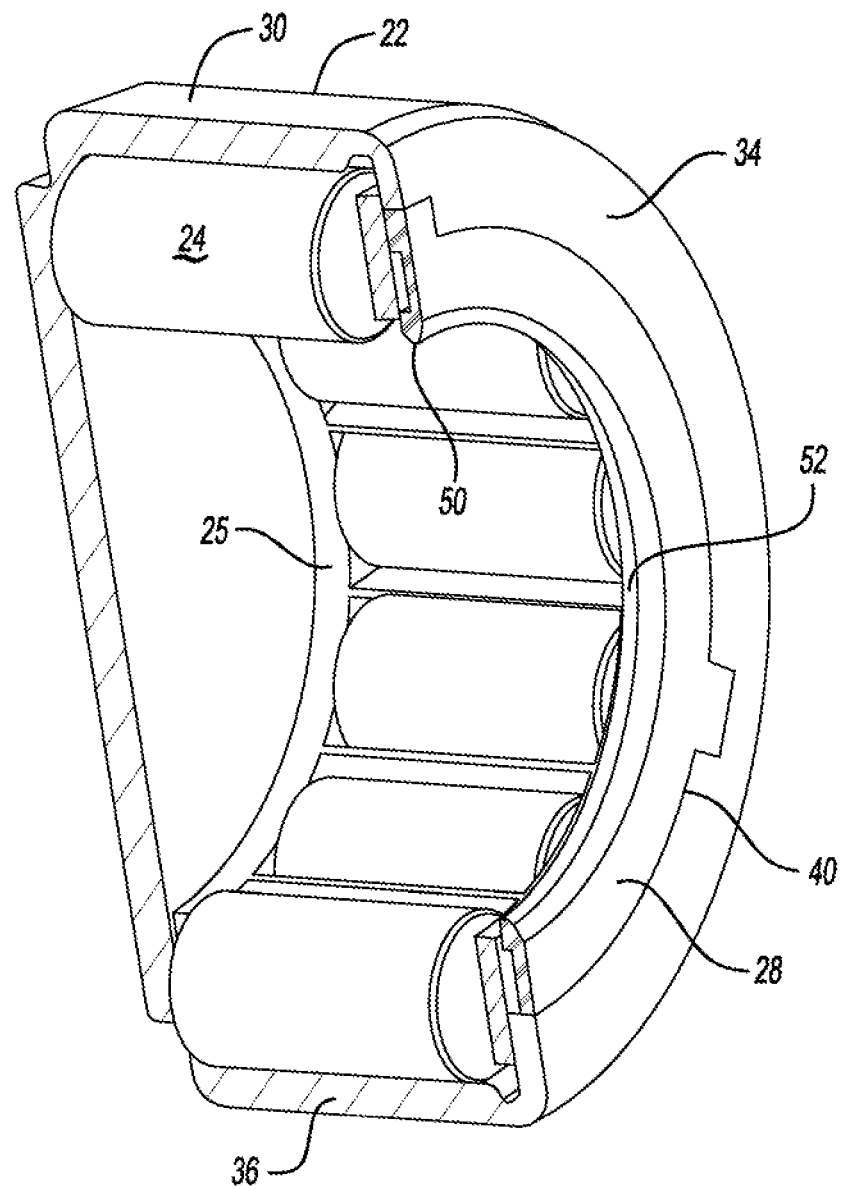
FIG. 2 is a perspective view, in cross section, of the rolling bearing.

Referring to FIGS. 1 and 2, a rolling bearing 20 may be used to support an end of a shaft 26. The bearing 20 may be fixed within a housing or connected to another rotating component. The bearing 20 supports the shaft 26 for rotation about the centerline 23. The bearing 20 and the shaft 26 may generally be concentric with a centerline 23. The rolling bearing 20 may include an annular cup 22, rolling elements 24, and a cage 25 that supports the rolling elements 24. The rolling elements may be cylindrical, spherical, or the like. The cup 22 may be closed-off on the one side and include an opening on the other side for receiving the shaft 26 therein. The opened end of the cup 22 may be sealed by a sealing disc 28. The sealing disc 28 is configured to engage with the shaft 26 and prevent contaminants from entering into the interior of the bearing 20.

The cup 22 may include a ring portion 30, a plate portion 32, and a flap portion 34. The ring portion 30 defines the outer race 36 on which the rolling elements 24 ride. In the illustrated embodiment, the bearing 20 does not include an inner race and the rolling elements 24 ride directly on the outer surface of the shaft 26. In other embodiments, an inner race may be included. The plate portion 32 forms a closed end 38 of the bearing 20 and the flap 34 is located on the other end of the bearing 20 and extends radially inward form the ring portion 30. The flap 34 defines an opening 40 to provide an open end 42 of the bearing.

The flap 34 includes an inner circumferential surface 44 that forms the periphery of the opening 40. The sealing disc 28 is disposed around the opening 40 with an outer circumferential surface 46 of the sealing disc 28 is seated on the inner circumferential surface 44. The flap 34 and the sealing disc 28 may have a substantially same axial thickness. The sealing disc 28 includes an inner circumferential surface 50 having a tip 52 formed thereon. Sealing disc 28 is sized so that the tip 52 engages with the outer surface of the shaft 26, i.e., an inner diameter of the sealing disc 28 substantially matches the outer diameter of the shaft 26. The sealing disc 28 is a dynamic seal that allows the shaft 26 to rotate relative to the sealing disc 28.

Figure 3:
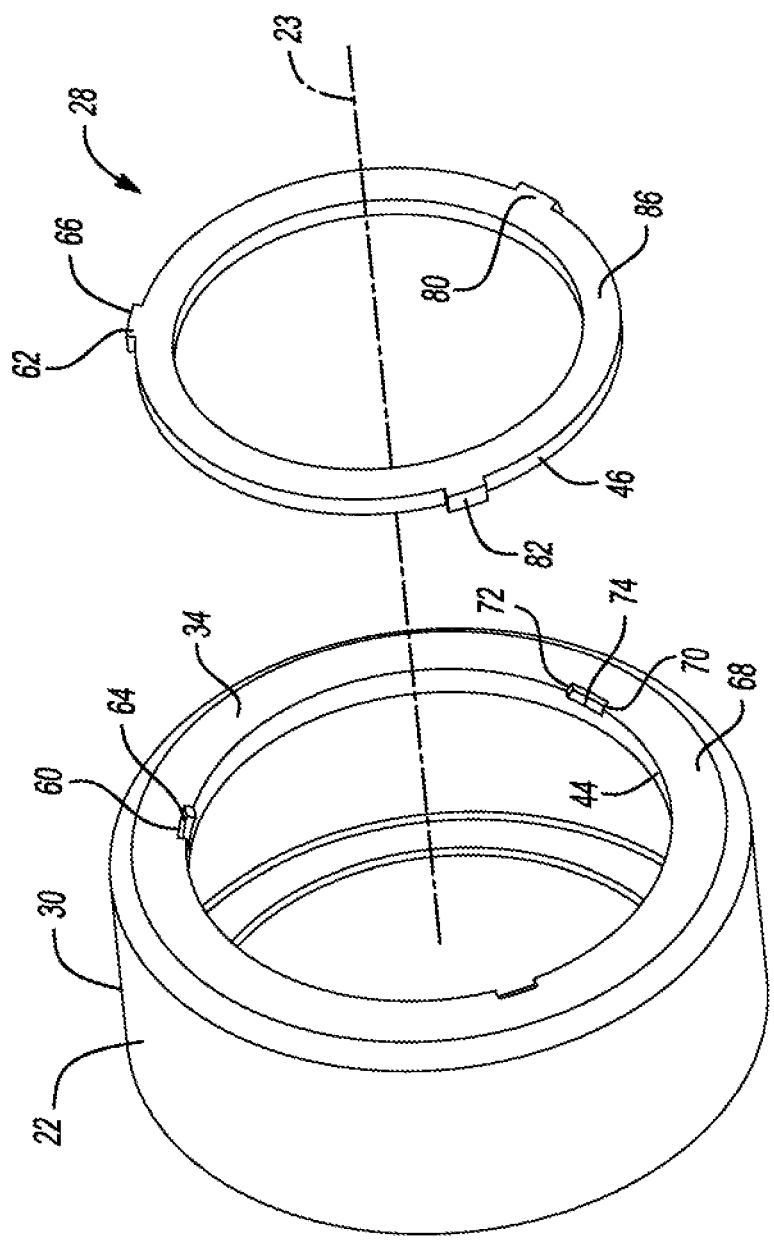
FIG. 3 is an exploded perspective view of the rolling bearing.
Figure 5:
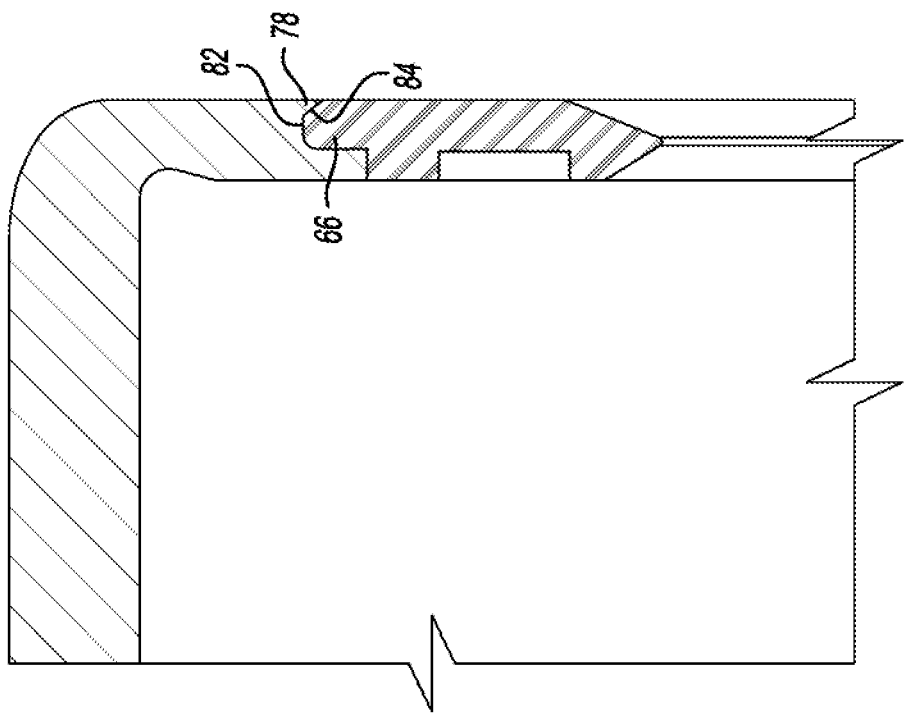
FIG. 5 is a detail view of the rolling bearing with the seal installed.
Figure 4:
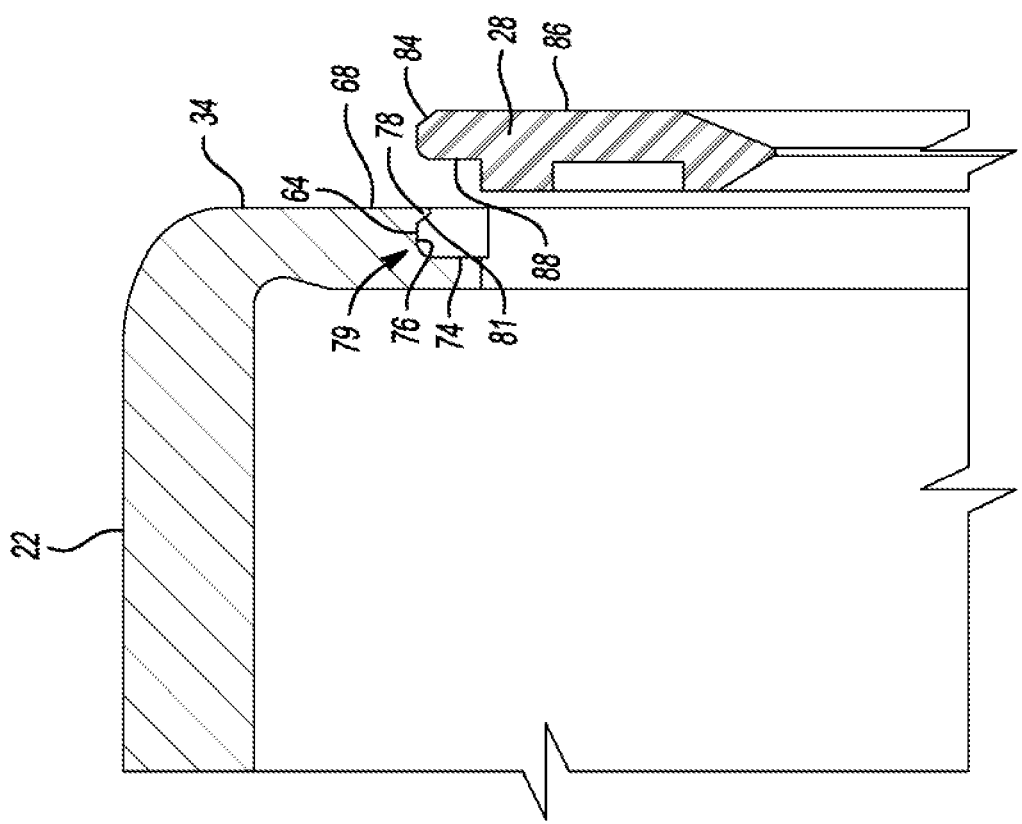
FIG. 4 is a detail view of the rolling bearing with the seal removed.

Referring to FIGS. 3, 4, and 5, the flap 34 and the sealing disc 28 include retaining features. The flap portion 34 and the sealing disc 28 may include cooperating first and second retaining features, 60, 62, respectively, that create a click-fit between the flap portion 34 and the sealing disc 28. In the illustrated example, the cup 22 defines at least one notch 64 that receives at least one tab 66 of the sealing disc 28. The notch 64 and the tab 66 are configured to form a click-fit. The bearing 20 may include three notches/tabs as shown or may include more or less in other embodiments. The notches 64 are circumferentially arranged around the inner circumferential surface 44 of the flap 34, and the tabs 66 are circumferentially arranged around the outer circumferential surface 46 of the sealing disc 28. The notches 64 and the tabs 66 may be positioned equidistant to each other such as the shown 120 spacing.

Each notch 64 is axially recessed into the outer face 68 of the flap 34 and extends radially outward from the inner circumferential surface 44. The notch 64 includes opposing sidewalls 70, 72 and a back wall 74 that extends between the sidewalls 70, 72. The notch also includes an outer circumferential wall 76 that extends between the sidewall 70, 72. A locking lip 78 extends radially inward from the outer circumferential wall 76 at the face 68 of the flap 34. The locking lip 78 cooperates with the outer circumferential wall 76 and the back wall 74 to define a channel 79.

Each of the tabs 66 includes a base portion 80 that is joined to the outer circumferential surface of the sealing disc 28 and a tip portion 82. The tab 66 may have a chamfered edge 84 formed on the front side 86 of the sealing disc 28. The chamfered edge 84 extends at an angle from the tip portion 82 to the front side 86 making the tip portion 82 thinner than the main portion of the tab 66. An axial thickness of the tab 66 may be less than an axial thickness of a main portion of the sealing disc 28. The tab 66 may be located at the front side 86 of the sealing disc 28.

The tip portion 82 is sized to be received in the channel 79. The tab 66 may be received within the notch 64 with the locking lip 78 extending over and disposed against the chamfered edge 84, the tip portion 82 disposed against the outer circumferential wall 76, and a backside 88 of the tab 66 disposed against the back wall 74. The locking lip 78 and the chamfered edge 84 cooperate to form the click-fit. For example, in one embodiment of a click-fit, the locking lip 78 includes a slanted wall 81 that is angled to match the angle of the chamfered edge 84, and extends over a portion the chamfered edge 84 when the tab 66 is received in the notch 64.

This sealing disc 28 is formed of an elastomeric material such acrylonitrile butadiene rubber (NBR), which is also known as nitrile rubber, or other suitable material. That allows the tabs 66 to deform and click into the notches 64. The tabs 66 are inserted into the notches 64 by providing axial force on the tabs, which causing radially contraction of the tip portion 82 as it passes over the locking lip 78. Once the tip portion 82 passes the locking lip 78, the tabs 66 rebound radially outward into the channels 79. The radial overlap between the locking lips 78 and the chamfered at edges 84 prevents the sealing disc 28 from detaching from the cup 22.

The sealing disc 28 may be further retained to the flap 34 by an interference fit between the outer circumferential surface 46 of the sealing disc 28 and the inner circumferential surface 44 of the flap 34. That is, the diameter of the outer circumferential surface 46 is larger than the diameter of the inner circumferential surface 44.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST rolling bearing 20
cup 22
centerline 23
rolling elements 24
cage 25
shaft 26
sealing disc 28
ring portion 30
plate portion 32
flap portion 34
outer race 36
end 38
opening 40
open end 42
inner circumferential surface 44
outer circumferential surface 46
inner circumferential surface 50
tip 52
notches 64
tabs 66
outer face 68
sidewalls 70
sidewalls 72 back wall 74
outer circumferential wall 76
locking lip 78
channel 79
base portion 80
wall 81
tip portion 82
edges 84
front side 86
backside 88

What is claimed is:

1. A bearing comprising:
an annular cup including an outer race and a radially extending flap, the flap defining an inner circumferential surface and a notch extending outwardly from the inner circumferential surface, wherein the notch includes opposing radially extending sides, an outer circumferential wall, and a locking lip raised from the outer wall;
rolling elements seated on the outer race and arranged to ride on a shaft; and
a sealing disc including an outer circumferential surface disposed against the inner circumferential surface and a tab received in the notch with the locking lip extending radially over the tab to secure the sealing disc to the cup.

2. The bearing of claim 1, wherein the outer circumferential wall and the locking lip cooperate to define a channel that receives a tip portion of the tab therein.

3. The bearing of claim 2, wherein the tip portion defines a chamfered edge, and the locking lip extends over and engages with the chamfered edge.

4. The bearing of claim 2, wherein the notch is a plurality of notches, and the tab is a plurality of tabs.

5. The bearing of claim 4, wherein the notches are circumferentially spaced around the flap, and the tabs are circumferentially spaced around the outer circumferential surface.

6. The bearing of claim 1, wherein the flap includes a radially extending face, and the notch is recessed into the face.

7. The bearing of claim 1, wherein an axial thickness of the tab is less than an axial thickness of a main portion of the sealing disc.

8. The bearing of claim 1, wherein the locking lip defines a V-shaped tip.

9. The bearing of claim 1, wherein a diameter of the outer circumferential surface of the sealing disc is larger than a diameter of the inner circumferential surface of the flap to form an interference fit.

10. The bearing of claim 1, wherein the cup further includes an end face forming a closed end of the cup opposite the flap.

11. The bearing of claim 1 further comprising a cage disposed within the cup and supporting the elements.

* * * * *